E. H. DRAKE.
Machine for Transmitting Power.

No. 214,375. Patented April 15, 1879.

WITNESSES:
C. Neveux
E. Sedgwick

INVENTOR:
E. H. Drake
BY Munn & Co
ATTORNEYS.

UNITED STATES PATENT OFFICE.

EDGAR H. DRAKE, OF HORSEHEADS, NEW YORK.

IMPROVEMENT IN MACHINES FOR TRANSMITTING POWER.

Specification forming part of Letters Patent No. 214,375, dated April 15, 1879; application filed November 7, 1878.

*To all whom it may concern:*

Be it known that I, EDGAR H. DRAKE, of Horseheads, in the county of Chemung and State of New York, have invented a new and Improved Machine for Transmitting Power, of which the following is a specification.

Figure 1:
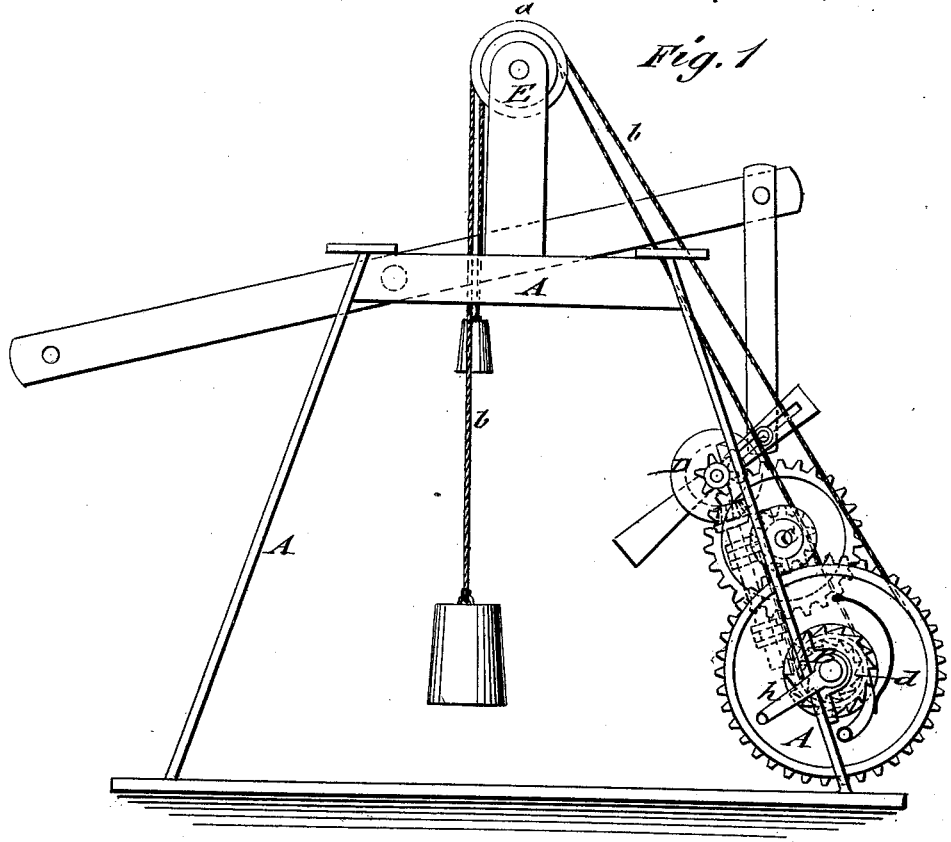
Figure 2:
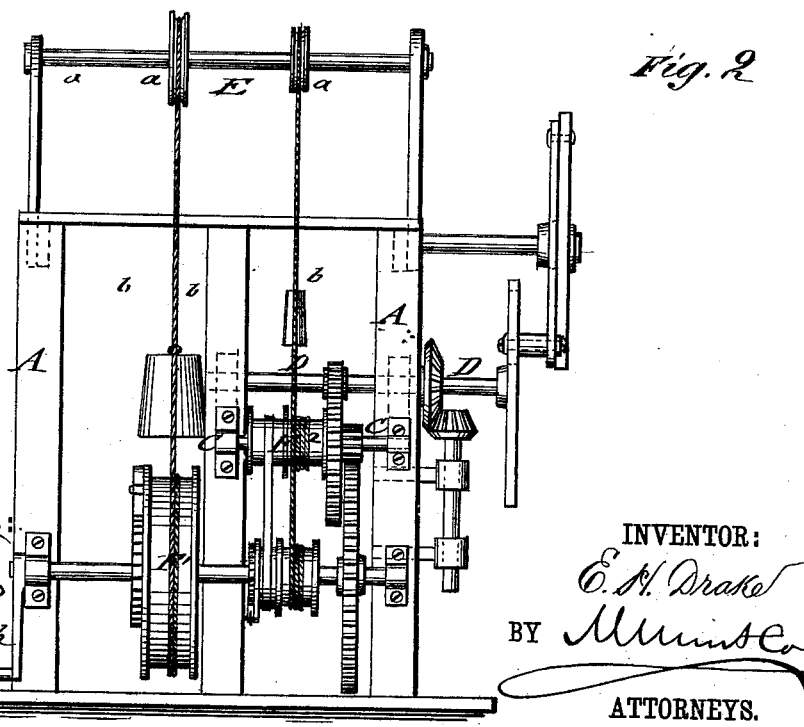

In the accompanying drawings, Figure 1 represents a side elevation of my improved machine for transmitting power, and Fig. 2 an end elevation of the same.

Similar letters of reference indicate corresponding parts.

The object of this invention is to furnish an improved machine for operating a churn, turning a grindstone, sawing wood, or for other applications in which a small power is required, so that the power exerted by weights is transmitted and applied to the different objects mentioned; and the invention consists of a large and small drum placed on the main or driving shaft, these drums being loose on the shaft and connected by a spring-pawl and ratchet device to the shaft.

The driving-weight is hoisted by an auxiliary shaft, with drum or weight and transmitting-gear, and by the large drum of the main shaft. The hoisted weight is then employed for operating any machine connected to the driving-gear. When down, it is again raised by the large drum and auxiliary-shaft arrangement, which, alternately with the direct action of the weight on the driving-shaft, keeps the machine in motion.

Referring to the drawings, A represents the supporting-frame of my improved machine for transmitting motion, which frame supports in bearings at the lower part a main shaft, B, and above the same an auxiliary shaft, C, that is connected to the main shaft by a transmitting-gear, and, by a second set of gear-wheels, to a driving-shaft, D, for operating a churn-gear or a lever-sweep, and thereby churn, saw, or to turn a grindstone, as the case may be.

At the top of frame A is supported in upright standards a fixed shaft, E, with loose pulleys $a$, over which the ropes $b$ of three drums, F, $F^1$, and $F^2$, pass. The drums F $F^1$ are loose upon the main shaft, and both are connected to the main shaft by spring-pawl and ratchet arrangements acting in opposite directions to each other.

$d$ is the ratchet of drum F, and $d'$ the ratchet of drum $F^1$. The third drum, $F^2$, is fast on the auxiliary shaft C, and is connected with drum $F^2$ by a belt.

The ropes are wound upon their respective drums, the weight being first suspended on the rope of the large or small drum of the main shaft, and, when it is run down, wound up by a small weight attached to rope of drum on auxiliary shaft. This shaft is operated the same way, owing to the ratchet-and-pawl connection with the drum.

When the weight attached to the first and second rope is up, that then operates the machine until it runs down. The weight is then again placed on the second rope, and by thus alternating the weights the machine is kept in motion. When the rope on the drum runs twice down, it is then wound up again by the crank-handle $h$.

The transmitting device may be applied to a variety of purposes in which small power is required by applying suitable transmitting-gearing to the driving-shaft.

Having thus described my invention, I claim as new and desire to secure by Letters Patent—

A machine for transmitting power, consisting of two loose drums of the main shaft, operated by ropes and weights, and connected by ratchet-and-pawl mechanism to the main shaft, and by transmitting-gear with an auxiliary shaft having a drum connected by a belt with the small drum on main shaft, the auxiliary shaft being connected by a second gearing to a transmitting-shaft, and operating-gear for setting machinery requiring a small power in motion, substantially as and for the purpose set forth.

EDGAR H. DRAKE.

Witnesses:
FRANK A. BENTLEY,
JOHN A. DRAKE.